United States Patent [19]

Knudsen

[11] Patent Number: 5,283,214
[45] Date of Patent: Feb. 1, 1994

[54] INCREASING AlN THERMAL CONDUCTIVITY VIA PRE-DENSIFICATION TREATMENT

[75] Inventor: Arne K. Knudsen, Midland, Mich.

[73] Assignee: The Dow Chemical Company, Midland, Mich.

[21] Appl. No.: 656,173

[22] PCT Filed: Sep. 1, 1989

[86] PCT No.: PCT/US89/03813

§ 371 Date: Feb. 26, 1991

§ 102(e) Date: Feb. 26, 1991

[51] Int. Cl.$^5$ ............................................. C04B 35/58
[52] U.S. Cl. ......................................... 501/96; 501/89
[58] Field of Search .................... 264/65; 501/96, 98, 501/88, 89, 92

[56] References Cited

U.S. PATENT DOCUMENTS

| | | | |
|---|---|---|---|
| 3,113,879 | 12/1963 | Foster et al. | 106/65 |
| 4,578,364 | 3/1986 | Huseby et al. | 501/98 |
| 4,578,365 | 3/1986 | Huseby et al. | 501/98 |
| 4,618,592 | 10/1986 | Kuramoto et al. | 501/96 |
| 4,642,298 | 2/1987 | Koramoto et al. | 501/96 |
| 4,666,873 | 5/1987 | Morris, Jr. et al. | 501/96 |
| 4,778,778 | 10/1988 | Mallia | 501/96 |
| 4,952,535 | 8/1990 | Merkel | 501/96 |

FOREIGN PATENT DOCUMENTS 0322719 7/1989 European Pat. Off.
1471035 1/1970 Fed. Rep. of Germany.

OTHER PUBLICATIONS

Chemical Abstract vol. 109, No. 14, Abstract No. 115034a (1988) pp. 296–247.

Primary Examiner—Karl Group
Assistant Examiner—Chris Gallo

[57] ABSTRACT

A method for producing dense aluminum nitride articles having enhanced thermal conductivity is disclosed. The method comprises the steps of forming a powder compact comprising AlN alone or in combination with other ceramic compounds, adding a densification aid, subsequently exposing the compact to an environment which serves to reduce the oxygen content of the compact, and then densifying the compact by sintering or hot-pressing to provide a dense article. The densified AlN article is found to have a high thermal conductivity.

20 Claims, 2 Drawing Sheets

INCREASING ALN THERMAL CONDUCTIVITY VIA PRE-DENSIFICATION TREATMENT

BACKGROUND OF THE INVENTION

As the electronics industry advances toward higher circuit densities, efficient thermal management will assume increasing importance. The removal of heat from critical circuit components through the circuit substrate is directly dependent on the thermal conductivity of the substrate. Beryllium oxide (BeO) has traditionally been the ceramic of choice for applications requiring electrically insulating materials having high thermal conductivity. Unfortunately, beryllium oxide is toxic to a small fraction of the general population, thus leading to a significant reluctance to use it.

Alumina ($Al_2O_3$) is nontoxic and is easily fired to full density at 1500°-1600° C.; however, its thermal conductivity of between about 20 to about 30 W/m°K is about one order of magnitude less than that of BeO (which has a thermal conductivity of about 260 W/m°K). Additionally, the coefficients of thermal expansion (CTE) over the range of 25°-400° C. for alumina ($6.7 \times 10^{-6}$/°C) and beryllia ($8.0 \times 10^{-6}$/°C) are not well matched to those of semiconductors such as silicon ($3.6 \times 10^{-6}$/°C), and gallium arsenide ($5.9 \times 10^{-6}$/°C). Thus, alumina and beryllia provide less than ideal results when used in applications such as integrated circuit substrates through which heat transfer is to occur. In contrast, the CTE for aluminum nitride (AlN) is $4.4 \times 10^{-6}$/°C, a value which is well matched to both of the previously described semiconductor materials.

In addition to having a CTE which makes it compatible with materials such as silicon and gallium arsenide, AlN can be sintered to provide shaped ceramic articles. Additionally, AlN articles are amenable to a variety of metallization processes. As such, AlN has repeatedly been suggested as a ceramic substrate for semiconductor applications. Although a variety of attempts to produce sintered AlN parts having high thermal conductivity are described in the literature, these generally have achieved limited success.

There is extensive literature on the sintering of AlN using a variety of sintering or densification aids. The bulk of the literature centers around the use of oxides of either rare earth elements (i.e., yttrium and lanthanide series elements), oxides of alkaline earth elements (i.e., the Group IIA elements), and mixtures thereof. These include compounds such as $Y_2O_3$, $La_2O_3$, CaO, BaO, and SrO. A system using $Y_2O_3$ and carbon is described in a variety of patents, such as U.S. Pat. No. 4,578,232, U.S. Pat. No. 4,578,233, U.S. Pat. No. 4,578,234, U.S. Pat. No. 4,578,364 and U.S. Pat. No. 4,578,365, each of Huseby et al.; U.S. Pat. Nos. 3,930,875 and 4,097,293 of Komeya; and U.S. Pat. No. 4,618,592 of Kuramoto. Additionally, there is a wide variety of patents using $Y_2O_3$ and YN including U.S. Pat. No. 4,547,471 of Huseby et al.

In the Huseby et al. patents which relate to the $Y_2O_3$ and carbon system, described above, AlN samples which are doped with $Y_2O_3$ and carbon are heated to 1500°-1600° C. for approximately one hour. The carbon serves to chemically reduce $Al_2O_3$ phases contained in the AlN, thereby producing additional AlN and lowering the overall oxygen level in each part. The patents state that the $Y_2O_3$ sintering aids are unaffected by this process. The parts are then sintered at about 1900° C. Thermal conductivities as high as 180 W/m°K have been reported for carbon treated samples produced by the methods described in these patents. Some evidence indicates, however, that these methods may introduce residual, free carbon within the sintered AlN piece, and this residual carbon can act to decrease the dielectric constant and loss throughout the piece. These effects may be undesirable in electronic applications, although acceptable in many other applications. Additionally, two other patents of Huseby et al. (U.S. Pat. No. 4,478,785 and U.S. Pat. No. 4,533,645) disclose a similar process that does not make use of a $Y_2O_3$ sintering aid.

Other techniques for the production of sintered AlN and high thermal conductivity AlN have also been disclosed. See, for example, U.S. Pat. No. 4,659,611 of Iwase et al., U.S. Pat. No. 4,642,298 of Kuramoto et al., U.S. Pat. No. 4,618.592 of Kuramoto et al., U.S. Pat. No. 4,435,513 of Komeya et al., U.S. Pat. No. 3,572,992 of Komeya et al., U.S. Pat. No. 3,436,179 of Matsuo et al., European Patent Application No. 75,857 of Tsuge et al., and U.K. Patent Application 2,179,677 of Tanicjuchi et al.

Thermal conductivities of up to 200 W/m°K have been reported in parts sintered from mixtures of 1-5% $YO_3$ and an aluminum nitride powder containing a low oxygen level (for example, an oxygen content less than 1.0%). See, for example, K. Shinozaki et al., *Seramikkusu*, 21(12):1130 (1986). In a presentation at the 89th Annual Meeting of the American Ceramic Society, (Pittsburgh, Pa., May 1987), Tsuge described a three stage process for increasing the thermal conductivity of sintered AlN parts. Further treatment of these parts for as long as 96 hours to remove the yttrium aluminate grain boundary phase reportedly can increase the thermal conductivity to 240 W/m°K. Finally, by treating these samples to increase the average grain size, thermal conductivities which approach the theoretical thermal conductivity of 320 W/m°K have been reported. This method, however, requires lengthy, multiple, independent steps to increase the thermal conductivity of the aluminum nitride material and produces sintered parts having large grain sizes. Additionally, the ultra-high thermal conductivity samples which have been produced to date contain extremely low levels of both oxygen (less than 400 ppm) and yttrium (less than 200 ppm).

Finally, German Patent DE 3,627,317 to Taniguchi et al. describes the use of mixtures of alkaline earth and rare earth halides and oxides to produce aluminum nitride parts that are reported to have thermal conductivities as high as 250 W/m°K.

This technology, however, has been demonstrated only with parts which are relatively thick (e.g., 6 mm or more). Thin samples, (on the order of 3 mm) such as those associated with circuit substrate applications exhibit significantly lower thermal conductivities, e.g. 170-205 W/m°K.

None of the processes described above teach the production, via a simple firing program, of sintered AlN parts having a thickness below about 6 mm and a thermal conductivity above about 220 W/m°K.

Additionally, each of the processes described above requires either the use of solid-phase carbon or carbonaceous compounds, or extended firing schedules to increase the thermal conductivity of the final sintered part. The use of solid-phase carbon or carbonaceous compounds interferes with the ability to increase the thermal conductivity of previously sintered aluminum nitride parts, and has the potential for leaving porosity in AlN greenware following the heat treatment step. This porosity may result in non-uniform sintering.

Since AlN is a material with a number of unique properties which render it particularly useful in electronic and structural applications, it is particularly desirable to develop a method for the production of high thermal conductivity aluminum nitride which is simple and does not require extremely long firing times to produce a dense article.

SUMMARY OF THE INVENTION

This invention pertains to a method for producing densified AlN articles having high thermal conductivity and articles produced thereby. More specifically, this invention pertains to a method for producing sintered or hot pressed AlN articles having a high thermal conductivity and a low oxygen content, thereby producing dense, high thermal conductivity AlN articles. The low oxygen content is the result of an oxygen-reducing treatment which is performed prior to the densification process. In its broadest sense, the invention comprises the steps of providing a powder compact comprising AlN and a densification aid, exposing the powder compact to an oxygen-reducing atmosphere, and densifying the oxygen-reduced compact to near the theoretical density under an atmosphere which will support densification of the powder compact. Alternatively, the oxygen-reducing step can be applied to the AlN powder prior to formation of the powder compact. The densification aid can be added either before or after the oxygen reduction.

The advantages of the present invention include the ability to produce dense AlN articles having high thermal conductivity from constituent powders containing oxygen at an elevated level (i.e., greater than about 1% oxygen by weight). This allows the production of thin AlN articles having higher thermal conductivity than previously obtainable, while eliminating the requirement for an extended firing schedule. Additionally, the present invention eliminates the need to mix free carbon powder into the powder of the powder compact, thereby allowing the production of a high quality part.

The process of this invention provides an aluminum nitride article which is electrically insulating and thermally conductive. The article possesses a low dielectric constant and a coefficient of thermal expansion close to that of both silicon and gallium arsenide. As such, the article is ideally suited for use as a substrate material for electronic components.

DETAILED DESCRIPTION OF THE INVENTION

Figure 1:
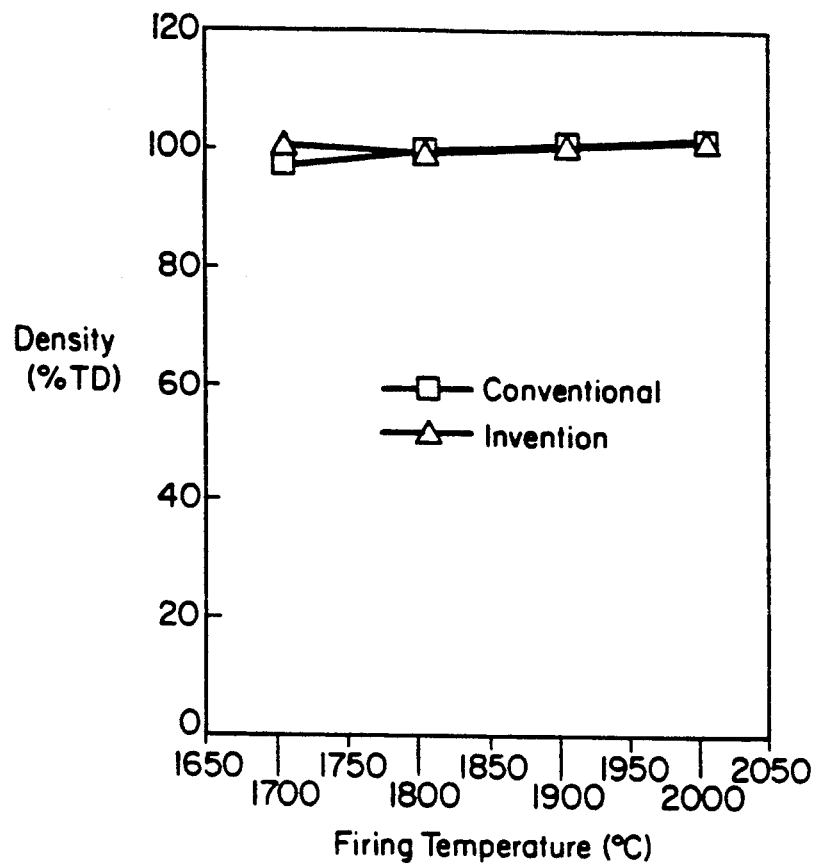
FIG. 1 is a plot of percent of theoretical density versus firing temperature for an AlN composite articles containing 10% BN, made according to this invention and made by a conventional method.

The thermal conductivity of dense aluminum nitride, (AlN), is very sensitive to metallic impurities as well as to oxygen ions residing within the crystallites of both polycrystalline and single crystal samples. Furthermore, depending upon the oxygen level and particle size, AlN may be difficult to densify by a sintering or hot pressing process without the addition of a densification aid. Such aids typically form an oxide-based, intergranular liquid phase within the part being sintered which facilitates oxygen removal, AlN diffusion and densification. Thus, it is desirable, when densifying AlN, to utilize a densification aid and process which facilitates the production of dense AlN parts having a minimum amount of oxygen present. Additionally, the process should be one which minimizes the introduction of undesired impurities. For electronics applications dense AlN articles should have a thermal conductivity greater than 130 W/m°K.

Oxygen exerts a critical influence during the densification of AlN. Although intergranular, oxide-based liquid phases are required for densification, oxygen remaining within the AlN grains upon the completion of consolidation limits the thermal conductivity of the article. This limitation of the thermal conductivity is believed to result from aluminum vacancies in the lattice caused by the oxygen within the AlN cystallites. These vacancies limit the thermal conductivity of the densified article. The oxygen concentration contained within the article can be determined indirectly from a measurement of bulk oxygen and the level of remaining densification aid, coupled with x-ray diffraction data on the phases of densification materials present in the article.

In conventional sintering processes, AlN is mixed with a sintering aid. While these sintering aids generally comprise rare earth oxides, alkaline earth oxides, and mixtures thereof, halides, silicides, nitrides, borides, hydrides and carbides of the rare earth and alkaline earth elements can be used as well. Alternatively, rare earth metals, alkaline earth metals and mixtures thereof can be used as suitable densification aids. A preferred rare earth oxide useful as a sintering aid is yttrium oxide ($Y_2O_3$). The mixture of AlN and densification aid is then formed into a shape by a variety of techniques. Tape casting, dry pressing, roll compaction, injection molding or any other suitable method can be used. The shape is then sintered at between about 1600° and about 2200° C. to form a dense AlN part. As used herein, the term "dense" refers to an article having a density of at least about 95% of the theoretical density of AlN.

The present invention relates to a method for the production of dense AlN articles having high thermal conductivities and which are produced from ceramic powders having oxygen present, e.g., greater than about 0.5%. These methods are further characterized by the ability to produce densified high thermal conductivity AlN articles using an oxygen-reducing treatment process.

Thermal conductivities are considered "high", as that term is used herein, to indicate thermal conductivities significantly increased over those of dense aluminum nitride articles which have not been treated according to the present invention. Such thermal conductivities are preferably at least 25% greater than obtained by dense AlN articles without treatment.

The term "AlN article" is used herein to include AlN composites. Such composites are formed by adding one or more ceramic powders, in addition to AlN, to the powder compact. Such AlN composites can contain up to about 90%, by weight, of ceramic powders in addition to AlN (based on total ceramic powder in the compact). Preferably such composites contain at least about 50%, by weight, of AlN.

One example of an additional ceramic powder suitable for AlN composites is BN. This compound contributes machinability, and can lower the dielectric constant of AlN articles for use as an electronic substrate or for complex heat sink applications.

Another example of an additional ceramic powder suitable for AlN composites is SiC, which adds hardness to articles including AlN and absorbs microwave energy. Thus, such an article of high thermal conductivity could be used as a cutting tool insert where hardness is important, or for radar absorbing applications such as for stealth aircraft.

In general, those skilled in the art will be able to form dense AlN articles of high thermal conductivity exhibiting the advantageous properties of constituent ceramic materials. By proportionately mixing combinations of ceramics to form a dense AlN article of the present invention, and employing the methods of the present invention to form such dense articles of high thermal conductivity, a balance of properties can be obtained suitable for prescribed applications of use.

One preferred AlN article is formed from a powder compact wherein the ceramic powders consist essentially of AlN. Resultant dense AlN articles exhibit a balance of physical properties desired, including thermal conductivities of 130 W/m°K or more.

The first step in the process is the preparation of a powder compact through any of a variety of processes including tape casting, dry pressing, injection molding, roll compaction, etc. The powder compact can be formed of AlN or mixtures of AlN and other ceramic powders including, but not limited to, BN, SiC, $B_4C$, $Si_3N_4$, $TiB_2$, TiC, etc.

A densificiation aid is typically added to the compact. The densification aid increases the density and/or facilitates densification of the powder compact forming during densification. In the preferred embodiment, the densification aid comprises $Y_2O_3$ and is equal to less than about 5% by weight of the powder compact.

Subsequent to the formation of a semi-dense compact (i.e., an article having a density of at least about 50% of the theoretical density), the semi-dense compact is treated to reduce its oxygen content. It should be noted herein that the theoretical density is a function of sintering aid concentration. Thus, for example, when $Y_2O_3$ (having a density of about 5.01 $g/cm^3$) is added to an AlN compact in the amount of about 3% by weight, the theoretical density of the resultant AlN compact and densification aid is about 3.30 $g/cm^3$.

The oxygen content of the compact and densification aid is reduced by exposing the mixture to an atmosphere which removes oxygen atoms from within the grains of the compact. Although atmospheres including mixtures of cracked $NH_3$ or gas phase hydrocarbons in $N_2$ or an inert gas can be used, a mixture of at least about 6% (by volume) $H_2$ in $N_2$ is preferred. Of the gas phase hydrocarbons, $CH_4$, $C_2H_4$, $C_2H_6$, $C_3H_8$ or mixtures thereof are preferred. Additionally, an atmosphere of 100% $H_2$ is also expected to yield desirable results. The compact is maintained in this environment at a temperature of between about 1500° and 1700° C. until the oxygen content of the article is below about 0.6%. As an alternative, the oxygen-reducing step can be performed on the AlN article powder constituents prior to the formation of the powder compact. In this method, the densification aid is added to the AlN powder constituents either before or after the oxygen reduction. Subsequent to the oxygen-reducing step, the oxygen-reduced powder mixture of powder compact and densification aid is formed.

Once an oxygen-reduced powder compact has been produced, the compact is sintered or hot pressed to achieve its final density. Representative sintering conditions, for example, are a temperature between about 1600° and about 2200° C. in an inert atmosphere such as $N_2$. It is preferable that the sintering atmosphere not be an oxygen reducing atmosphere. This is because the presence of trace oxygen will enhance the sintering process. In fact, the enhancement caused by a trace oxygen content in the article during densification is the reason a sintering aid such as $Y_2O_3$ is commonly used in known sintering processes. The best results are obtained when fully oxygen-reduced samples having an oxygen content below about 0.5% are sintered in an atmosphere free of vapor phase carbon. This is because a carbon-containing atmosphere would likely decrease the oxygen content to a point below that which is desirable for sintering. Alternatively, the oxygen content can be reduced to a level somewhat greater than 0.6% followed by densification in an atmosphere which slightly reduces oxygen in order to yield a similar result. Although trace oxygen is desirable in sintering processes, hot-pressing, even in the low oxygen state, yields highly satisfactory results.

In some cases, the oxygen-reducing step may significantly reduce the materials which form the oxide liquid phase in the powder compact (for example, $Y_2O_3$ and $Al_2O_3$). Such a result leads to difficulty in sintering and is the equivalent of eliminating the densification aid entirely. If this does occur, it is desirable to slightly increase the partial pressure of the oxygen in the sintering environment by providing an oxygen-containing gas or by enclosing the part in an oxygen-containing medium such as a supporting matrix or crucible of AlN or BN having a controlled oxygen content. Such efforts, however, are needed only to aid sintering in AlN articles having oxygen concentrations far below about 0.6%. Alternatively, if the powder compact is to be hot pressed rather than sintered, parts having oxygen contents below about 0.3% oxygen by weight can be produced without the requirement of oxygen addition during densification.

In contrast to the two stage firing process described above, the process can also be performed in a single reaction chamber with a single firing having two hold periods. In one embodiment, the semi-dense article can be heated under carbonaceous oxygen-reducing atmosphere to a temperature of about 1600° C. Vapor phase carbon is added to the article; preferably by flowing a lower hydrocarbon such as $CH_4$, $C_2H_4$, $C_2H_6$, $C_3H_8$ or a mixture thereof into the sintering chamber. Once the desired oxygen reduction has been achieved, an inert atmosphere can be flowed into the vessel while increasing the vessel temperature to a desired sintering temperature. These conditions are maintained until the sintered article has achieved full density.

In another preferred embodiment, vapor phase carbon is provided by employing a furnace which uses carbon as a material of construction. In this embodiment, the powder compact is placed in an apparatus such as a carbon-containing furnace and subjected to heat treatment in a hydrogen-containing atmosphere. The hydrogen in the atmosphere serves to transport vapor phase carbon to the article and can be supplied by $H_2$, $NH_3$, $CH_4$ or other hydrocarbons or non-organic, hydrogen-containing, compounds which remain in the gas phase throughout the processing conditions. The combination of the hydrogen and atmospheric vapor phase carbon provided by the furnace serves to reduce the amount of oxygen contained within the powder compact. The atmosphere can then be replaced by one which does not contain hydrogen to thereby reduce the transport of vapor phase carbon to the powder compact. Upon heating to a sintering temperature, the powder compact will achieve full density. Although this embodiment provides less control of the atmospheric carbon content than methods which introduce carbonaceous gasses from external sources, it eliminates the need to actively supply the atmospheric additive. Rather, the vapor phase carbon is supplied passively via the carbon-containing furnace.

The present invention will now be more fully illustrated in the following examples.

EXAMPLE 1

AlN powder having the following characteristics was used:

| | |
|---|---|
| Agglomerated Particle Size (um) | 1.5 |
| Ultimate Particle Size (um) | 0.3 |
| Surface Area ($m^2$/g) | 3.5 |
| Al (wt %) | 65.2 |
| N (wt %) | 33.4 |
| O (wt %) | 1.0 |
| C (wt %) | 0.06 |
| Ca (ppm) | 75 |
| Mg (ppm) | 20 |
| Fe (ppm) | 20 |
| Si (ppm) | 104 |
| Other metals (ppm) | 10. |

The AlN powder was mixed with 3% by weight $Y_2O_3$, (99.99% Pure), in 2-propanol and ball milled using AlN cylinders in a plastic jar. This material was then dried under a vacuum and maintained in a dry environment. The oxygen content at this point, as measured by combustion was 1.88%. 13.4 g samples of the powder were die pressed into powder compacts using a 1.25 × 1.25 inch steel die. The density of these powder compacts was measured as about 52% of the theoretical value of 3.30 g/$cm^3$.

The powder compact samples were placed on graphite foil in a graphite crucible and inserted into a carbon resistance furnace. An atmosphere containing about 6% by volume $H_2$ in $N_2$ was introduced into the vessel and the temperature was raised to about 1580° C. These conditions were maintained for about 6 hours.

Upon cooling and removal from the furnace, the oxygen content of the powder compact samples was measured and found to be 0.52%. This value is about 72% less than the initial oxygen concentration. The samples were a light pink color and showed evidence of only a small degree of sintering when analyzed with a scanning electron microscope.

The powder compact samples were then placed in a boron nitride crucible between boron nitride plates. The crucible contained a small quantity of a low surface area, high purity AlN powder and had a loose-fitting boron nitride lid. The crucible was placed into a carbon resistance furnace and sintered at 1900° C. under an $N_2$ atmosphere for about 12 hours.

After the part was cooled and removed from the furnace, a 0.5 inch diameter by 0.22 inch disk was removed from the sample for a measurement of thermal conductivity via the laser flash method. The sample was coated with a thin layer of graphite to prevent transmission of laser radiation through the sample, as well as to increase the absorptivity and emissivity of the front and rear surfaces respectively. The thermal conductivity of the plug was measured and found to be about 234 W/m°K.

EXAMPLE 2

2 grams of the ALN/$Y_2O_3$ powder mixture described in the previous example were pressed into a pellet having a diameter of about ⅜ inch. The pellet was heat treated at about 1600° C. for about 6 hours under the $H_2$-containing $N_2$ atmosphere described above. The pellet was then hot pressed at about 1900° C. in a BN-coated graphite die under $N_2$ for about 0.5 hours at 3000 psi. Upon measurement, the thermal conductivity of this part was found to be about 200 W/m°K.

Upon a subsequent heat treatment step in which the part was heated in a carbon crucible under $N_2$ for about 12 hours at about 1900° C., the thermal conductivity was observed to increase to about 251 W/m°K.

EXAMPLE 3

AlN + 3% $Y_2O_3$ samples described in Example 1, were prepared via a "dry-pressing" procedure. This process involved compounding the ceramic composition with an organic binder. This composition was die-pressed under an applied uniaxial pressure of at least 10,000 psi into a powder compact. The binder was then removed either during the heat treatment process or in a separate step prior to the firing process. A number of articles were heat treated to demonstrate that the oxygen removal efficiency of the heat treatment process is dependent upon the part geometry, (particularly the part thickness), as well as the initial oxygen level of the samples. The organic binder (6% by weight) was burned out of the samples designated A and C (Table 1) prior to the application of the heat treatment. The carbon level of identically-treated samples after binder removal was measured at 0.15 wt %. The carbon level in the AlN powder was about 0.04–0.07 wt %. The samples designated B were burned out upon heat-up for the heat treatment step. Such a burn-out in an $N_2$ environment was employed to yield a slightly higher carbon level, i.e., approximately 0.2 wt %.

TABLE 1

| Part[1] | Initial Oxygen Level (wt %) | Heat Treatment Time (min)[2] | Final Oxygen Level (wt %) |
|---|---|---|---|
| A | 1.9 | 30 | 0.60 |
| A | 1.9 | 60 | 0.57 |
| A | 1.9 | 240 | 0.36 |
| B | 1.9* | 30 | 0.93 |
| B | 1.9* | 60 | 0.82 |
| B | 1.9* | 240 | 0.27 |
| C | 2.31 | 30 | 1.07 |
| C | 2.31 | 60 | 1.01 |

[1] A 13" × 1.13" × 0.071"
B 1.5" × 1" × 0.25"
C 1" × 1" × 0.25"
[2] Carbon furnace, porous carbon setters, 1580° C., 6% $H_2$/94% $N_2$.
*Binder removed during heating.

These results demonstrate that the oxygen level in thinner parts can be reduced more quickly than thicker parts. In addition, the articles having a higher oxygen content can also be deoxidized, although the time required is longer than for parts having a lower initial oxygen level. This was demonstrated with thin (0.05 in. parts) which had initial oxygen levels as high as 3.5 wt %.

EXAMPLE 4

Using a composition consisting of AlN+3% by weight $Y_2O_3$ (no binder), pellets measuring 22 mm in diameter and weighing 2 g each were die-pressed with an applied uniaxial pressure of at least 10,000 psi. The resulting pellets were then treated as described in Table 2. The results show the effects of atmosphere and ceramic setter composition on the efficiency of oxygen removal in the articles.

TABLE 2

| Part | Initial Oxygen Level (wt %) | Heat Treatment Conditions | Final Oxygen Level (wt %) |
| --- | --- | --- | --- |
| 1 | 1.9 | 2 h, 1500° C., boron nitride setter, 6% $H_2$/94% $N_2$ | 1.79 |
| 2 | 1.9 | 2 h, 1540° C., boron nitride setter, 6% $H_2$/94% $N_2$ | 1.50 |
| 3 | 1.9 | 2 h, 1500° C., carbon setter, 6% $H_2$/94% $N_2$ | 1.22 |
| 4 | 1.9 | 2 h, 1540° C., carbon setter, 100% $N_2$ | 1.28 |
| 5 | 1.9 | 2 h, 1556° C., carbon setter, 6% $H_2$/94% $N_2$ | 0.64 |
| 6 | 1.9 | 6 h, 1580° C., boron nitride setter, tungsten furnace 6% $H_2$/94% $N_2$ | 1.82 |

The oxygen removal process was significantly faster when the pellets were placed in contact with carbon. Also, the oxygen removal rate was enhanced in the presence of hydrogen. Elevated temperatures resulted in an increase in the oxygen removal rate both with BN and carbon setters. In the absence of carbon (the tungsten furnace experiments), essentially no oxygen removal was observed. Thus the presence of carbon, either in the furnace hardware or in the vapor phase ($CH_4$, etc.), appears to have been a requirement for oxygen reduction.

EXAMPLE 5

Using a composition consisting of AlN+3% by weight $Y_2O_3$ (no binder), pellets measuring 22 mm in diameter and weighing 2 g each were die-pressed with an applied uniaxial pressure of at least 10,000 psi. These pellets were then heat treated on carbon setters at 1580° C. in an atmosphere of 6%$H_2$/94% $N_2$ as described in Table 3. The furnace configuration was different than was used in Table 2, thereby accounting for the difference in oxygen levels. The furnace used to compile this data yielded lower residual oxygen levels than the furnace used in Example 4.

These results show the effect of heat treatment time on the oxygen level in the articles. Thus, the oxygen level in the greenware can be controlled by the appropriate choice of heat treatment temperature, atmosphere, and time.

TABLE 3

| Part | Heat Treatment Time (min) | Final Oxygen Level (wt %) |
| --- | --- | --- |
| 1 | No treatment | 1.8 |
| 2 | 0.1 | 1.58 |
| 3 | 30 | 1.21 |
| 4 | 45 | 1.11 |
| 5 | 60 | 0.79 |

EXAMPLE 6

Using compositions consisting of AlN+3% by weight $Y_2O_3$ (no binder) as well as AlN powder without any sintering additive, pellets measuring 22 mm in diameter and weighing 2 g each were die-pressed with an applied uniaxial pressure of at least 10,000 psi. These pellets were then heat treated on carbon setters at 1600° C. in an atmosphere of either 6%$H_2$/94% $N_2$ or 100% $N_2$ as described in Table 4. The furnace configuration was different from that used in Table 3, thereby accounting for the difference in oxygen levels. The furnace used to compile this data tended to yield higher residual oxygen levels than the furnace used in Example 4. These results show that the $Y_2O_3$ was substantially reduced while the oxide in the AlN was only partially reduced.

TABLE 4

| Part | Heat Treatment Time (min) | Final Oxygen Level (wt %) | Phases (XRD)[1] |
| --- | --- | --- | --- |
| 1* | 360 ($H_2/N_2$) | 0.35 | AlN |
| 2** | 270 ($N_2$) | 0.52 | AlN, YN |
| 3** | 120 ($H_2/N_2$) | 0.70 | AlN, YN, $Y_2O_3$ |

[1]Phase identification was accomplished using a conventional powder X-ray diffractometer using Cu (K-alpha) radiation.
*100 wt % AlN; initial oxygen level: 2 wt %.
**97% AlN + 3 wt % $Y_2O_3$; initial oxygen level: 1.8 wt %.

Thus, X-ray diffraction demonstrated that in compacts with an oxygen level of 0.70%, both YN and $Y_2O_3$ were present while in compacts having an oxygen level below about 0.5 wt %, only YN was observed. Thus, the heat treatment resulted in the reduction of $Y_2O_3$ to YN as well as the removal of oxygen from the AlN powder.

The AlN powder used in the examples apparently had an intractable oxygen content of about 0.35% or less. It is expected that different AlN powders will exhibit varying levels of intractable oxygen.

EXAMPLE 7

Using a composition consisting of AlN+3% by weight $Y_2O_3$ (no binder), pellets measuring 22 mm in diameter and weighing 2 g each were die-pressed with an applied uniaxial pressure of at least 10,000 psi. These pellets were then heat treated to reduce the oxygen level. The pellets were densified by both hot pressing and sintering as summarized in Table 5.

TABLE 5

| Sample No. | Post Heat Treatment Oxygen Content (wt %) | Densification[1] | TC(W/m °K.) |
| --- | --- | --- | --- |
| 1 | 1.58 | HP at 1900° C. | 127 |
| 2 | 1.58 | HP at 1900° C. | 147 |
| 3 | 1.21 | HP at 1900° C. | 180 |
| 4 | 1.58 | PS at 1900° C. | 130 |
| 5 | 0.79 | PS at 1900° C. | 184 |

TABLE 5-continued

| Sample No. | Post Heat Treat-Treatment Oxygen Content (wt %) | Densification[1] | TC(W/m °K.) |
|---|---|---|---|
| 6 | 0.64 | PS at 1900° C. | 206 |

[1]HP = Hot pressed at 3000 psi in $N_2$ using BN-coated graphite dies in a carbon resistance furnace.
PS = Pressureless sintered in BN crucible, embedded in AlN powder.

The results show the effects of oxygen level and densification method on the thermal conductivity of the articles prepared by this invention. The data can be contrasted with hot pressing and sintering experiments which show that articles not subjected to heat treatment and having initial oxygen levels of approximately 1.9% (3% $Y_2O_3$) exhibit thermal conductivities of roughly 120 and 101 W/m°K after hot pressing and pressureless sintering respectively.

EXAMPLE 8

A mixture of 90 parts AlN, 10 parts BN, and 3 parts by weight $Y_2O_3$ were dispersed in toluene containing 4% by weight (based on the ceramic) dispersant (50/50 mixture of menhaden fish oil and Oloa 1200). The solids loading in the slip was adjusted to about 40 volume percent. The slip was ball milled for 16 hours using AlN media and then dried in a rotary evaporator followed by overnight drying in a vacuum oven.

Small pellets, 22 mm in diameter, were prepared in a stainless steel die with a uniaxial pressure of 10,000 psi. These parts were then placed on graphite setters and heat treated in a graphite crucible for two hours in an atmosphere of 6% $H_2$ in $N_2$. These parts were then removed from the furnace, loaded into a 22 mm graphite die and hot pressed at 1900° C. The thermal conductivity was measured via the laser flash technique.

Figure 2:
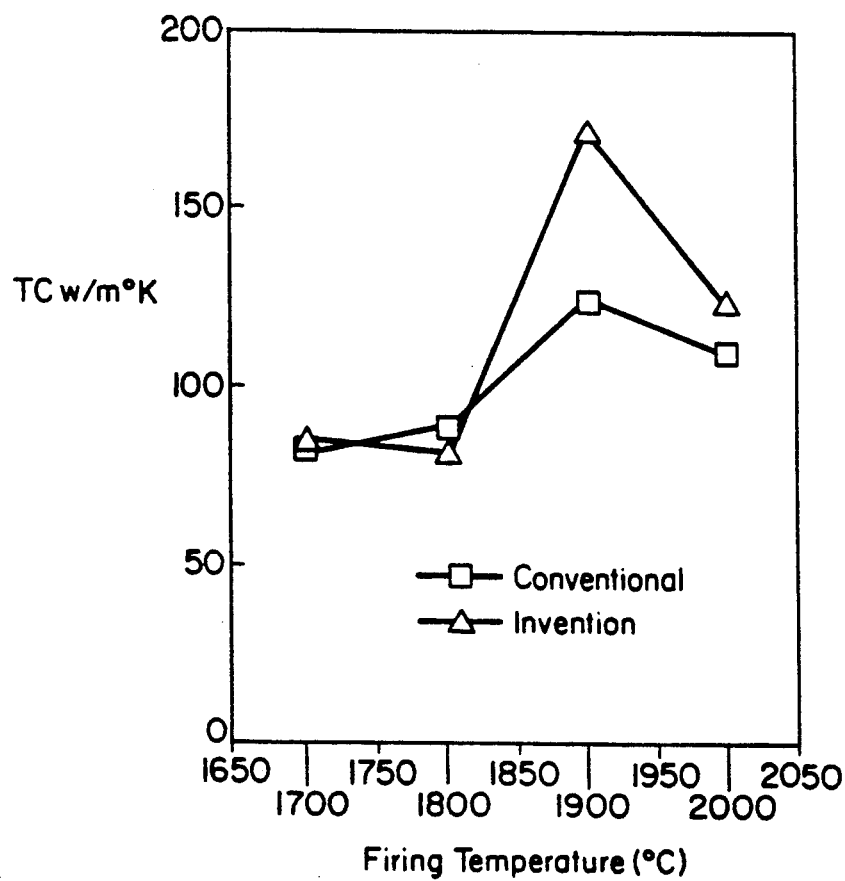
FIG. 2 is a plot of thermal conductivity versus firing temperature for AlN composite article containing 10% boron nitride made according to this invention and made by a conventional method.

As shown in FIG. 1, articles formed by conventional methods and by the present invention exhibit approximately 100% of theoretical density when fired at temperatures in the range of between about 1700° C. and 2000° C. FIG. 2 shows that thermal conductivity of AlN articles formed by the present invention exceeded those formed by conventional methods when articles are fired at temperatures above about 1820° C.

EXAMPLE 9

A mixture of 90 parts AlN, 10 parts SiC, and 3 parts by weight $Y_2O_3$ were dispersed in toluene containing 4% by weight (based on the ceramic) dispersant (50/50 mixture of menhaden fish oil and Oloa 1200). The solids loading in the slip was adjusted to about 40 volume percent. The slip was ball milled for 26 hours using AlN media and then dried in a rotary evaporator followed by overnight drying in a vacuum oven.

Figure 3:
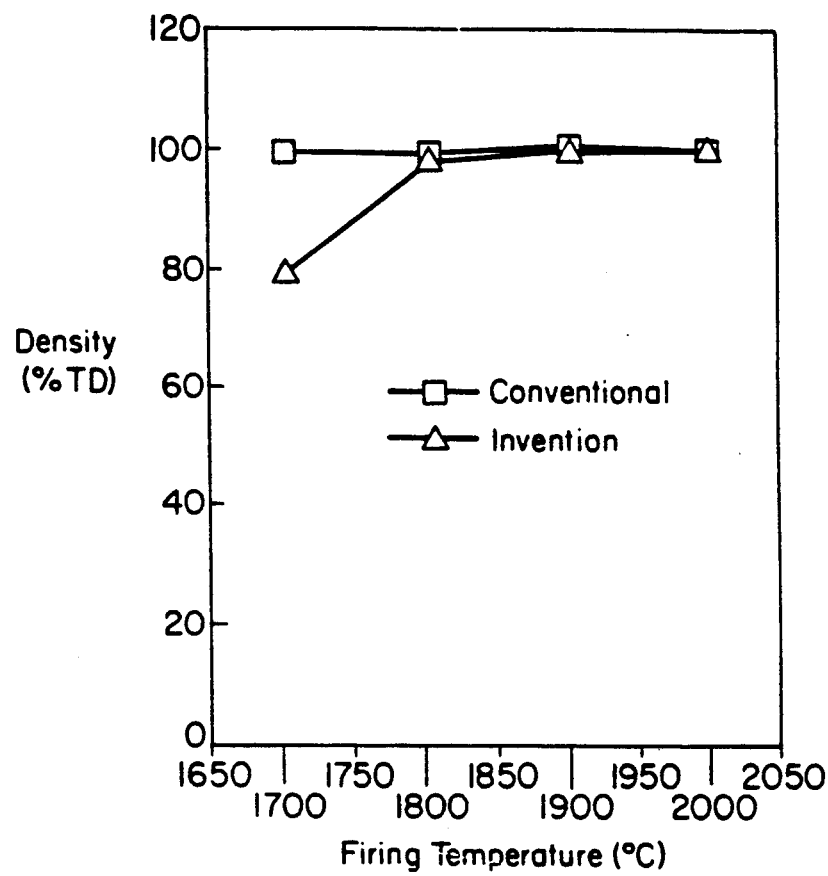
FIG. 3 is a plot of percent of theoretical density versus firing temperature for an AlN composite article containing 10% SiC, made according to this invention and made by a conventional method.
Figure 4:
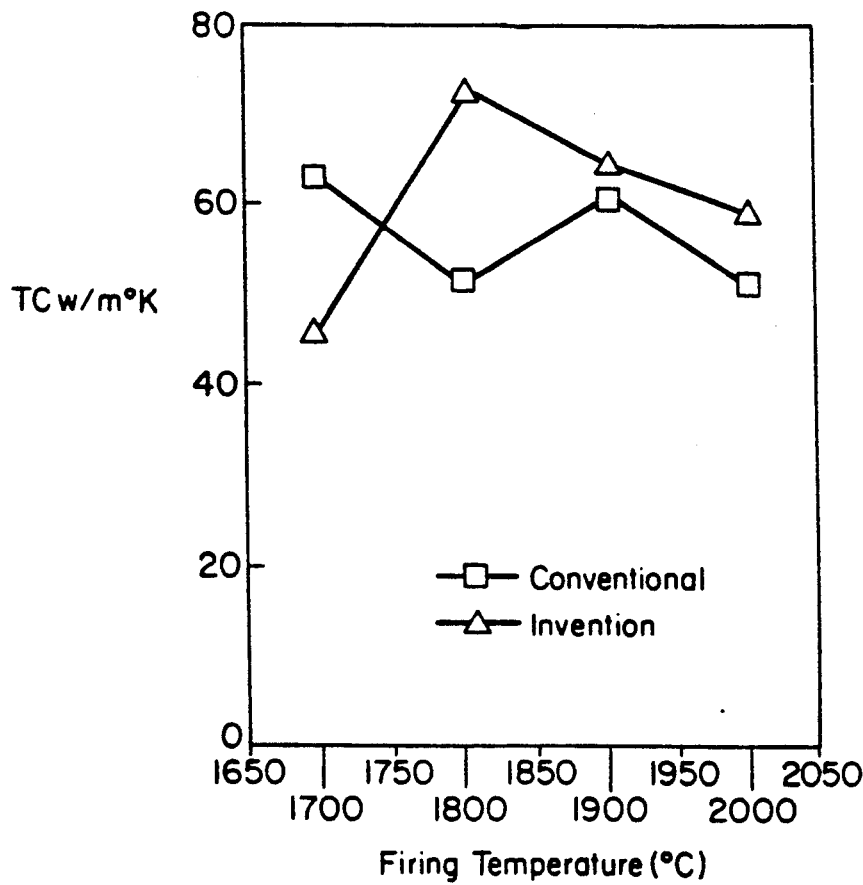
FIG. 4 is a plot of thermal conductivity versus firing temperature for an AlN composite article containing 10% silicon carbide, made according to this invention and made by a conventional method.

Small pellets, 22 mm in diameter, were prepared in a stainless steel die with a uniaxial pressure of 10,000 psi. These parts were then placed on graphite setters and heat treated in a graphite crucible for two hours in an atmosphere of 6% $H_2$ in $N_2$. These parts were then removed from the furnace, loaded into a 22 mm graphite die and hot pressed at 1900° C. The thermal conductivity was measured via the laser flash technique. As shown in FIG. 3, theoretical densities of samples fired at temperatures in the range of about 1800° C. to about 2000° C. approximated 100% for both conventionally made articles and for articles made by the present invention. Articles formed according to the present invention exhibit somewhat less than theoretical density at firing temperatures below 1800° C. than those formed by conventional methods. As shown in FIG. 4, AlN articles formed according to the present invention have higher thermal conductivities than those formed by conventional methods at firing temperatures above approximately 1750° C.

EQUIVALENTS

Those skilled in the art will recognize, or be able to ascertain using no more than routine experimentation, many equivalents to the specific embodiments of the invention described herein. Such equivalents are intended to be encompassed in the following claims.

I claim:

1. A method for producing a dense AlN article having a high thermal conductivity from an oxygen-containing AlN powder compact, comprising the steps of:
    a) exposing the AlN powder compact to a temperature in the range of between about 1500° C. and about 1700° C. in an environment which reduces oxygen content of the powder compact to an amount which, upon densifying the AlN powder compact, provides a dense AlN article having high thermal conductivity; and thereafter
    b) densifying the AlN powder compact to form the dense AlN article.

2. The method of claim 1 wherein the powder compact contains ceramic powder components consisting essentially of AlN.

3. The method of claim 2 wherein the powder compact contains ceramic powder components consisting essentially of AlN and BN.

4. The method of claim 2 wherein the powder compact contains ceramic powder components consisting essentially of AlN and SiC.

5. The method of claim 2 wherein the oxygen reducing environment is selected from the group consisting of vapor phase carbon, $H_2$, $NH_3$, other hydrogen containing inorganic gases, vapor phase hydrocarbons and mixtures thereof either alone or with inert gases.

6. A method for producing a dense AlN article having a high thermal conductivity from an oxygen-containing AlN powder compact, comprising the steps of:
    a) exposing the AlN powder compact to a temperature in the range of between about 1500° C. and about 1700° C. in an environment under conditions sufficient to reduce the oxygen content of the AlN powder compact to a level which, upon densifying, provides a dense AlN article having a thermal conductivity of at least 130 W/m°K, the AlN powder compact containing a densification aid and having a ceramic powder component consisting essentially of AlN; and thereafter
    b) densifying the powder compact to form the dense AlN article.

7. A method of claim 6 wherein the densification aid comprises $Y_2O_3$.

8. A method of claim 7 wherein the oxygen-reducing environment is selected from the group consisting of $H_2$, $NH_3$, other hydrogen-containing inorganic gases, vapor phase hydrocarbons and mixtures thereof either alone or with inert gases.

9. The method of claim 8 wherein the AlN powder compact is exposed in step (a) to a temperature of between about 1,500° C. to abut 1,700° C. under an atmosphere of about 6% $H_2$ by volume and $N_2$ for a period of time sufficient to reduce oxygen content of the AlN powder compact to a level which, upon densifying the AlN power compact, provides a dense AlN article having a thermal conductivity of at least 130 W/m°K.

10. The method of claim 6 wherein the powder compact is exposed in step (a) to an environment which reduces oxygen content to the AlN powder compact to a level sufficient to produce, upon densifying the powder compact, a dense AlN article having an oxygen content below about 1% by weight.

11. A method for producing a dense AlN article having a high thermal conductivity from an oxygen-containing AlN powder compact, comprising the steps of:
   a) exposing the AlN powder compact to a temperature in the range of between about 1500° C. and about 1700° C. in an environment which reduces the oxygen content of the AlN powder compact to a level which, upon densifying the powder compact, provides a dense AlN article having high thermal conductivity, the AlN powder compact containing a densification aid and having a ceramic powder component consisting essentially of AlN and BN; and thereafter
   b) densifying the powder compact to form the dense AlN article.

12. A method for producing a dense AlN article having a high thermal conductivity from an oxygen-containing AlN powder compact, comprising the steps of:
   a) exposing the AlN powder compact to a temperature in the range of between about 1500°0 C. and about 1700° C. in an environment which reduces the oxygen content of the AlN powder compact to a level which, upon densifying the AlN powder compact, provides a dense AlN article having high thermal conductivity, the AlN powder compact containing a densification aid and having a ceramic powder component consisting essentially of AlN and SiC; and thereafter
   b) densifying the powder compact to form the dense AlN article.

13. A method for producing a dense AlN article having a high thermal conductivity from an oxygen-containing AlN powder compact, comprising the steps of:
   a) exposing at least one ceramic powder component of the AlN powder compact to a temperature in the range of between about 1500° C. and about 1700° C. in an environment which reduces oxygen content of the ceramic powder component for a period of time sufficient to reduce the oxygen content to a level which, upon densifying the AlN powder compact, provides a dense AlN article having high thermal conductivity; thereafter
   b) forming the AlN powder compact from the oxygen-reduced ceramic powder component; and
   c) densifying the AlN powder compact to form the dense AlN article.

14. A dense AlN article which consists essentially of AlN and SiC and having a of at least 130 W/M°K thermal conductivity.

15. A dense AlN article having a high thermal conductivity formed by a method of claim 1.

16. A dense AlN article having a thermal conductivity of at least 130 W/M°K formed by a method of claim 6.

17. A dense AlN article having a high thermal conductivity formed by a method of claim 11.

18. A dense AlN article having a high thermal conductivity formed by a method of claim 12.

19. A dense AlN article having a high thermal conductivity formed by a method of claim 13.

20. A dense ALN article which consists essentially of ALN and BN and Having a thermal conductivity of at least 130 W/M°K.

* * * * *

UNITED STATES PATENT AND TRADEMARK OFFICE
CERTIFICATE OF CORRECTION

PATENT NO. : 5,283,214
DATED : February 1, 1994
INVENTOR(S) : Arne K. Knudsen

It is certified that error appears in the above-identified patent and that said Letters Patent is hereby corrected as shown below:

On title page, item [54] and col. 1, lines 1-2, title should read --INCREASING AlN THERMAL CONDUCTIVITY VIA PRE-DENSIFICATION TREATMENT--

Col. 12, lines 56-57, claim 7, should read
--The method of claim 6 wherein the densification aid comprises $Y_2O_3$. --

Col. 12, claim 8, line 58, should read --The method of --.

Col. 12, claim 9, line 65, should read --to about 1,700°C--

Column 13,
Claim 12, line 28, should read -- of between about 1500°C and --.

Signed and Sealed this

Twenty-seventh Day of September, 1994

Attest:

BRUCE LEHMAN

Attesting Officer          Commissioner of Patents and Trademarks